US010609349B2

(12) United States Patent
Furuya (10) Patent No.: US 10,609,349 B2
(45) Date of Patent: Mar. 31, 2020

(54) IMAGE DISPLAY DEVICE FOR GENERATING AN IMAGE HAVING A VIEWING DISTANCE WHICH VARIES IN THE DEPTH DIRECTION (71) Applicant: Panasonic Intellectual Property Management Co., Ltd., Osaka (JP)

(72) Inventor: Hiroyuki Furuya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 15/901,892

(22) Filed: Feb. 22, 2018

(65) Prior Publication Data
US 2018/0270455 A1 Sep. 20, 2018

(30) Foreign Application Priority Data
Mar. 15, 2017 (JP) ................. 2017-050184

(51) Int. Cl.
*H04N 9/31* (2006.01)
*G02B 27/01* (2006.01)
(Continued)

(52) U.S. Cl.
CPC ............ *H04N 9/317* (2013.01); *B60K 35/00* (2013.01); *G02B 27/0101* (2013.01); *G02B 27/0149* (2013.01); *H04N 9/3129* (2013.01); *B60K 37/02* (2013.01); *B60K 2370/152* (2019.05); *B60K 2370/155* (2019.05);
(Continued)

(58) Field of Classification Search
CPC ...... H04N 9/317; H04N 9/3129; B60K 35/00; G02B 27/0149; G02B 27/0101
See application file for complete search history.

(56) References Cited

U.S. PATENT DOCUMENTS 8,857,996 B2* 10/2014 Kawasumi ........... H04N 9/3152
349/7
2008/0143979 A1* 6/2008 Konno ............... G02B 26/0858
353/98
(Continued)

FOREIGN PATENT DOCUMENTS

JP 2016-186509 10/2016
JP 2016-224287 12/2016

*Primary Examiner* — Kwang-Su Yang
(74) *Attorney, Agent, or Firm* — McDermott Will & Emery LLP (57) ABSTRACT An image display device includes a light source, a screen, an optical system, a converging lens, an optical distance correction member, and a scanning unit. The converging lens is configured to converge the light emitted from the light source onto the screen. The optical distance correction member is disposed between the converging lens and the screen. The scanning unit scans the screen with the light from the light source. The screen is disposed so as to be inclined with respect to a plane perpendicular to an optical axis of the converging lens so that a viewing distance of the virtual image gradually varies. The optical distance correction member adjusts an optical distance of light transmitting through the optical distance correction member so that a distance between the screen and a focusing position of the light is made substantially identical over an entire image display region in the screen.

7 Claims, 9 Drawing Sheets (51) Int. Cl.
*B60K 35/00* (2006.01)
*B60K 37/02* (2006.01)

(52) U.S. Cl.
CPC .. *B60K 2370/1529* (2019.05); *B60K 2370/31* (2019.05); *B60K 2370/333* (2019.05); *B60K 2370/334* (2019.05); *G02B 2027/0114* (2013.01); *G02B 2027/0127* (2013.01); *G02B 2027/0154* (2013.01); *H04N 9/312* (2013.01); *H04N 9/3155* (2013.01); *H04N 9/3161* (2013.01); *H04N 9/3164* (2013.01); *H04N 9/3167* (2013.01)

(56) References Cited

U.S. PATENT DOCUMENTS

| | | | |
|---|---|---|---|
| 2013/0023966 A1* | 1/2013 | Depfenhart | A61B 18/203 607/89 |
| 2016/0195721 A1* | 7/2016 | Evans | G02B 27/0172 345/8 |

* cited by examiner

IMAGE DISPLAY DEVICE FOR GENERATING AN IMAGE HAVING A VIEWING DISTANCE WHICH VARIES IN THE DEPTH DIRECTION

BACKGROUND

1. Technical Field

The present disclosure relates to an image display device. For example, the present disclosure relates to an image display device suitable for being mounted on a moving body such as a vehicle.

2. Description of the Related Art

In recent years, an image display device called a head-up display has been developed and has been mounted on a moving body such as a vehicle. In a head-up display mounted on a vehicle, light modulated by image information is projected toward a windshield (windscreen), and the light reflected by the windshield is applied to driver's eyes. In this way, the driver can see a virtual image of an image in front of the windshield. For example, a vehicle speed, an outside air temperature, and the like are displayed as the virtual image. Recently, it is also considered to display, as a virtual image, a navigation image and an image for calling the attention on the passengers to the driver.

An image display device having a configuration in which a viewing distance of a virtual image is varied in stages using two screens is described in Unexamined Japanese Patent Publication No. 2016-224287 and Unexamined Japanese Patent Publication No. 2016-186509. Herein, the two screens are disposed such that respective distances of optical paths between the two screens and an observation position (a position of eyes) are different from each other. With this configuration, an observer can see two images whose viewing distances vary in stages in a depth direction.

SUMMARY

An image display device according to a main aspect of the present disclosure includes a light source, a screen, an optical system, a converging lens, an optical distance correction member, and a scanning unit. The screen is irradiated with light from the light source, and an image is formed on the screen. The optical system forms a virtual image by using the light from the screen. The converging lens is configured to converge the light emitted from the light source onto the screen. The optical distance correction member is disposed between the converging lens and the screen. The scanning unit scans the screen with the light from the light source. Herein, the screen is disposed so as to be inclined with respect to a plane perpendicular to an optical axis of the converging lens so that a viewing distance of the virtual image gradually varies. The optical distance correction member adjusts an optical distance of light transmitting through the optical distance correction member so that a distance between the screen and a focusing position of the light is made substantially identical over an entire image display region in the screen.

In the image display device according to the present aspect, the screen is disposed so as to be inclined so that the viewing distance of the virtual image gradually varies, whereby an image whose viewing distance gradually varies in a depth direction can be displayed. Furthermore, the optical distance correction member causes the distance between the screen and the focusing position of the light to be substantially identical over the entire image display region in the screen. Therefore, the light can be uniformly focused on the screen in any scanning position, thereby displaying an image with high definition. Hence, in the image display device according to the present aspect, the high-definition image whose viewing distance gradually varies in the depth direction can be displayed.

As described above, according to the present disclosure, the image display device capable of displaying the high-definition image whose viewing distance gradually varies in the depth direction can be provided.

Effects or meanings of the present disclosure will be further clarified in the following description of an exemplary embodiment. However, the exemplary embodiment described below is merely an example of implementing the present disclosure, and the present disclosure is not at all limited to the examples described in the following exemplary embodiment.

DETAILED DESCRIPTION OF EMBODIMENT

Prior to describing an exemplary embodiment of the present disclosure, a problem found in conventional techniques will be briefly described. When an image (for example, an arrow) for navigation, which indicates a traveling direction of a vehicle, is displayed while superimposing the image on a road surface, a virtual image is preferably configured such that a viewing distance of the virtual image gradually varies. However, in configurations in Unexamined Japanese Patent Publication No. 2016-224287 and Unexamined Japanese Patent Publication No. 2016-186509, a viewing distance is caused to vary in stages by using two screens. Therefore, it is difficult to display a virtual image such that the viewing distance of the virtual image gradually varies.

In view of the problem in the conventional techniques, the present disclosure provides an image display device capable of displaying a high-definition image whose viewing distance gradually varies in a depth direction.

Hereinafter, an exemplary embodiment of the present disclosure will be described with reference to the accompanying drawings. For the sake of convenience, X, Y and Z-axes perpendicular to one another are added to respective drawings. This exemplary embodiment relates to an on-vehicle head-up display to which the present disclosure is applied.

Figure 1A:
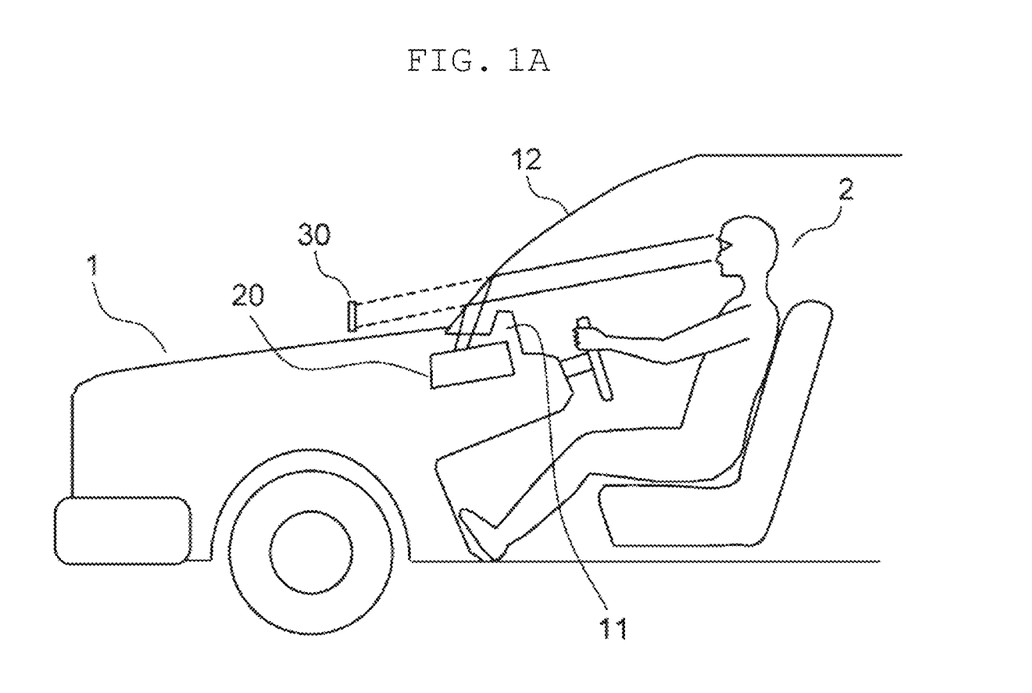
FIG. 1A is a schematic view illustrating a usage form of an image display device according to an exemplary embodiment.
Figure 1B:
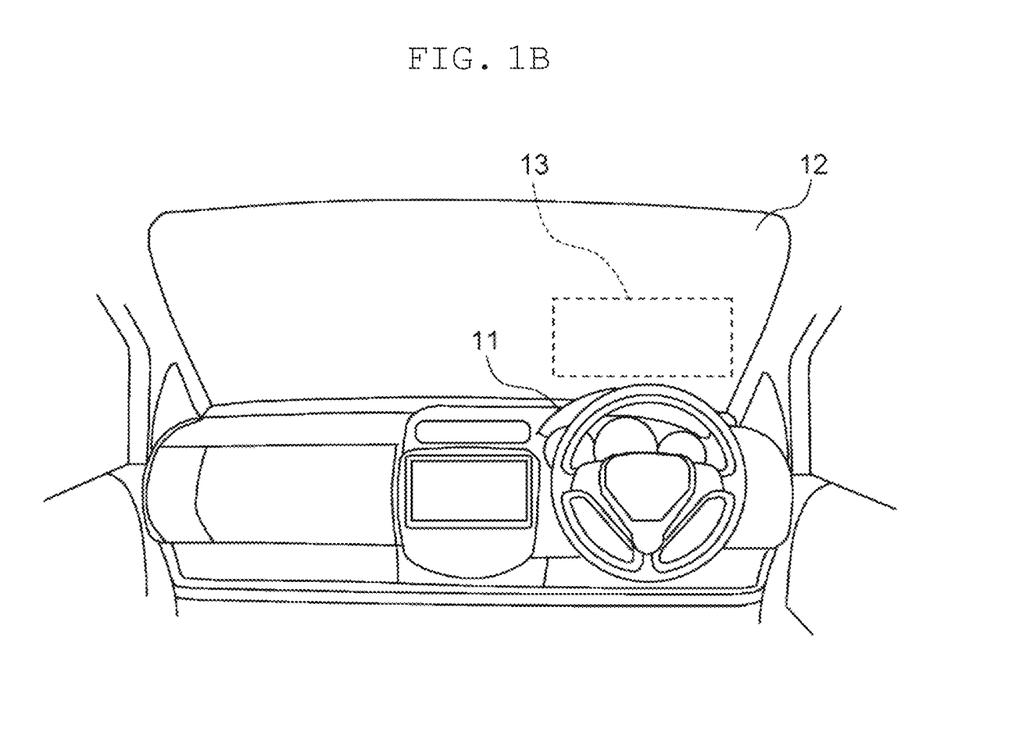
FIG. 1B is a schematic view illustrating the usage form of the image display device according to the exemplary embodiment.

FIGS. 1A and 1B are schematic views each illustrating a usage form of image display device 20. FIG. 1A is a schematic view illustrating, in a see-through manner, an inside of vehicle 1 as seen from the side of vehicle 1, and FIG. 1B is a view of a front of vehicle 1 in a driving direction as seen from the inside of vehicle 1.

As illustrated in FIG. 1A, image display device 20 is installed inside dashboard 11 of vehicle 1.

As illustrated in FIG. 1A and FIG. 1B, image display device 20 projects a laser beam, which is modulated by an image signal, onto projection region 13 near a driver's seat on a lower side of windshield 12. The laser beam is reflected by projection region 13, and is applied to a laterally long region (eyebox region) in the periphery of a position of eyes of driver 2. In this way, predetermined image 30 is displayed as a virtual image in a viewing field in front of driver 2. Driver 2 can see image 30, which is a virtual image, in an overlapping manner on a scene in front of windshield 12. That is, image display device 20 forms image 30, which is a virtual image, in a space in front of projection region 13 of windshield 12.

Figure 1C:
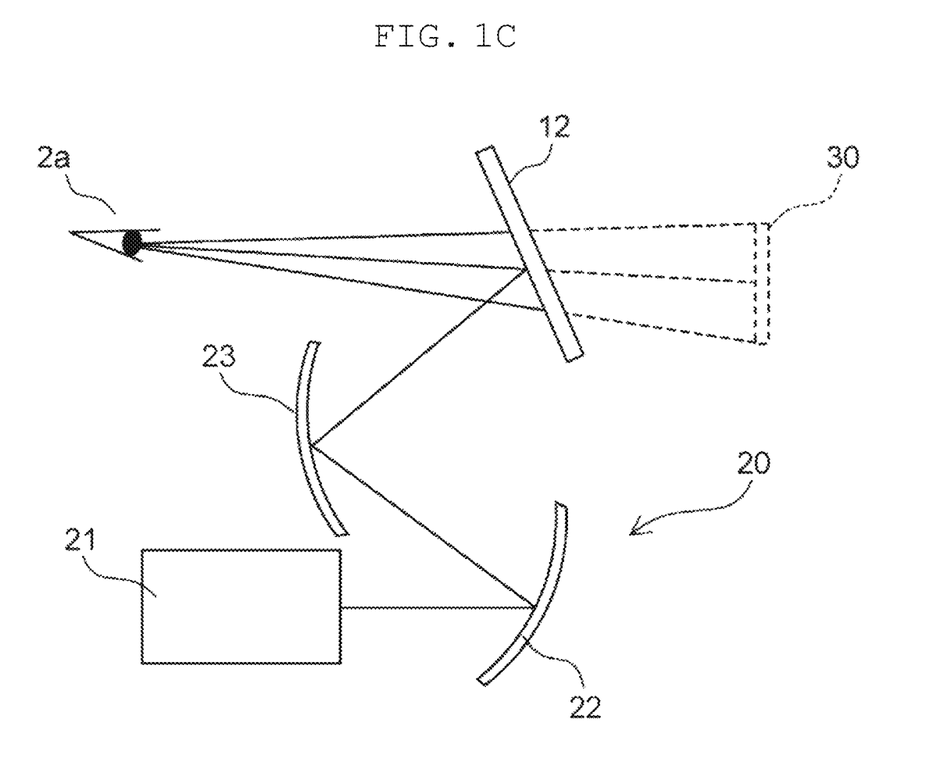
FIG. 1C is a schematic view illustrating a configuration of the image display device according to the exemplary embodiment.

FIG. 1C is a schematic view illustrating a configuration of image display device 20.

Image display device 20 includes irradiation light generator 21 and mirrors 22, 23. Irradiation light generator 21 emits a laser beam modulated by an image signal. Mirrors 22, 23 have curved reflecting surfaces, and reflect the laser beam emitted from irradiation light generator 21 toward windshield 12. The laser beam reflected by windshield 12 is applied to eye 2a of driver 2. Mirrors 22, 23 and an optical system of irradiation light generator 21 are designed such that image 30 as a virtual image is displayed in a predetermined size in front of windshield 12. Mirrors 22, 23 collectively configure an optical system for generating the virtual image.

Figure 2:
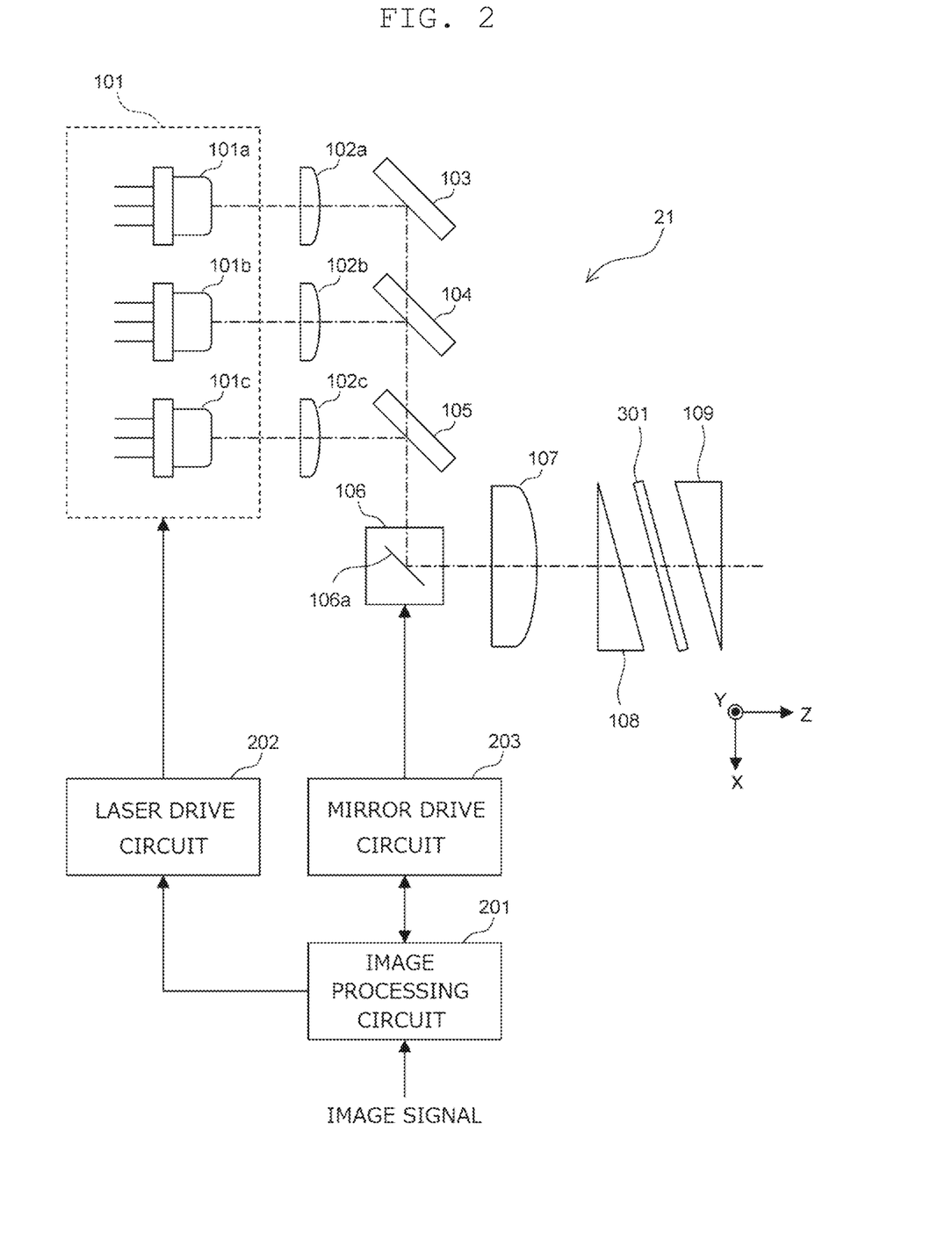
FIG. 2 is a diagram illustrating a configuration of an irradiation light generator of the image display device according to the exemplary embodiment and a configuration of circuits used for the irradiation light generator.

FIG. 2 is a diagram illustrating a configuration of irradiation light generator 21 in image display device 20 and a circuit configuration used for irradiation light generator 21.

Irradiation light generator 21 includes light source 101, collimator lenses 102a to 102c, mirror 103, dichroic mirrors 104, 105, scanning unit 106, converging lens 107, optical distance correction member 108, refraction correction member 109, and screen 301. Irradiation light generator 21 projects a laser beam for generating an image generated from screen 301 in a positive direction of the Z-axis.

Light source 101 includes three laser light sources 101a to 101c. Laser light sources 101a to 101c respectively emit a laser beam in a red wavelength band, a laser beam in a green wavelength band, and a laser beam in a blue wavelength band. In this exemplary embodiment, in order to display a color image as image 30, light source 101 includes three laser light sources 101a to 101c. In cases where a monochrome image is displayed as image 30, light source 101 may include only one laser light source corresponding to a color of the image. Laser light sources 101a to 101c are configured with semiconductor lasers, for example.

Laser beams emitted from laser light sources 101a to 101c are respectively converted into substantially parallel light by collimator lenses 102a to 102c. At this time, the laser beam emitted from each of laser light sources 101a to 101c is shaped into a circular beam shape by an aperture (not illustrated). Note that, in place of collimator lenses 102a to 102c, shaping lenses may be used, each of which shapes the laser beam into a circular beam shape and collimates the laser beam. In such a case, the aperture can be omitted.

Then, with respect to the laser beams of the respective colors emitted from laser light sources 101a to 101c, optical axes of the laser beams are aligned with one another by mirror 103 and two dichroic mirrors 104, 105. Mirror 103 substantially totally reflects the red laser beam transmitted through collimator lens 102a. Dichroic mirror 104 reflects the green laser beam transmitted through collimator lens 102b, and transmits the red laser beam reflected by mirror 103. Dichroic mirror 105 reflects the blue laser beam transmitted through collimator lens 102c, and transmits the red laser beam and the green laser beam, which have passed through dichroic mirror 104. Mirror 103 and two dichroic mirrors 104, 105 are disposed so as to align the optical axes of the laser beams of the respective colors with one another, the laser beams being emitted from laser light sources 101a to 101c.

Note that, laser light sources 101a to 101c are disposed such that all polarization directions of the laser beams of the respective colors are made equal to an identical direction after the optical axes the laser beams of the respective colors are aligned with one another. More specifically, rotational positions (rotational positions around respective light axes) of laser light sources 101a to 101c are adjusted such that all polarization directions of the laser beams are made equal to a horizontal direction when the laser beams of the respective colors enter windshield 12.

Scanning unit 106 reflects the laser beams of the respective colors that have passed through dichroic mirror 105. Scanning unit 106 is configured with, for example, a micro electro mechanical system (MEMS) mirror. And scanning unit 106 includes a configuration that rotates mirror 106a around an axis parallel to the Y-axis and an axis perpendicular to the Y-axis in response to a drive signal. The laser beams of the respective colors having passed through dichroic mirror 105 enter to mirror 106a. By rotating mirror 106a as described above, whereby a reflecting direction of the laser beam changes in an in-plane direction on an X-Z plane and in an in-plane direction on a Y-Z plane. In this way, as described later, screen 301 is scanned by the laser beams of the respective colors.

Note that, although scanning unit 106 is configured with the MEMS mirror of such a two-axis driving system here, scanning unit 106 may have another configuration. For example, scanning unit 106 may be configured with a combination of a mirror rotationally driven around the axis parallel to the Y-axis and a mirror rotationally driven around the axis perpendicular to the Y-axis.

Converging lens 107 converges the laser beam incident from scanning unit 106 onto a light incident surface of screen 301. In this disclosure, "light incident surface" means a surface to which a light is incident, and "light emitting surface" means a surface from which a light emits.

Optical distance correction member 108 adjusts an optical distance of the laser beam transmitting through optical distance correction member 108 such that a distance between screen 301 and a focusing position of the laser beam from light source 101 is made substantially identical over an entire image display region in screen 301. Refraction correction member 109 corrects refraction produced in the laser beam by optical distance correction member 108. Effects of optical distance correction member 108 and refraction correction member 109 will be described later, with reference to FIG. 4A to FIG. 5A.

Screen 301 is scanned by the laser beam to form an image, and screen 301 diffuses the incident laser beam to a region (eyebox region) in the periphery of a position of eye 2a of driver 2. Screen 301 is made of a transparent resin such as polyethylene terephthalate (PET). Screen 301 is disposed so as to be inclined with respect to a plane perpendicular to a light incident direction of a main light ray of the laser beam, which is a plane perpendicular to the Z-axis, toward a direction parallel to the X-Z plane by a predetermined angle.

Image processing circuit 201 includes an arithmetic processing unit such as a central processing unit (CPU) and a memory, processes an image signal that is input thereto, and controls laser drive circuit 202 and mirror drive circuit 203. Laser drive circuit 202 varies emission intensity of laser light sources 101a to 101c in response to a control signal from image processing circuit 201. Mirror drive circuit 203 drives mirror 106a of scanning unit 106 in response to the control signal from image processing circuit 201.

Figure 3A:
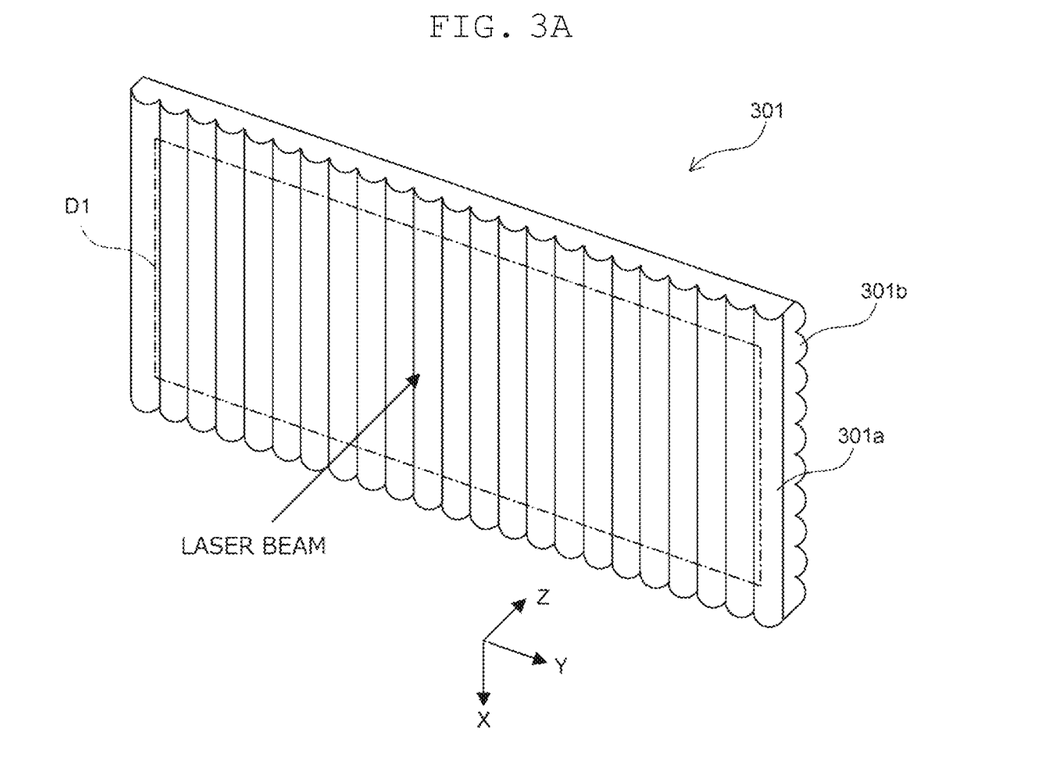
FIG. 3A is a schematic perspective view illustrating a configuration of a screen according to the exemplary embodiment.
Figure 3B:
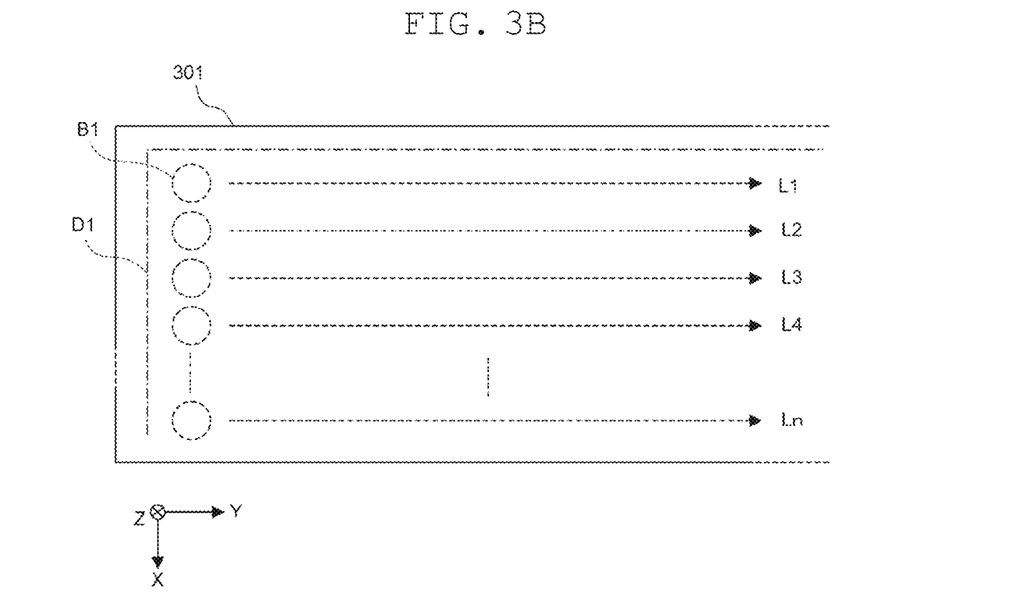
FIG. 3B is a schematic view illustrating a scanning method of a laser beam with respect to the screen according to the exemplary embodiment.

FIG. 3A is a schematic perspective view illustrating a configuration of screen 301. FIG. 3B is a schematic view illustrating a scanning method of the laser beam with respect to screen 301.

As illustrated in FIG. 3A, a plurality of first lens units 301a for diverging the laser beam in the Y-axis direction are formed on a laser light incident surface of screen 301 (that is, a surface on a negative side of the Z-axis) to be arranged in the Y-axis direction. A shape of each of first lens units 301a as seen in the X-axis direction is a substantially circular arc shape. A width of each of first lens units 301a in the Y-axis direction is, for example, 50 μm.

Further, a plurality of second lens units 301b for diverging the laser beam in the X-axis direction are formed on a laser light emission surface of screen 301 (that is, a surface on a positive side of the Z-axis) to be arranged in the X-axis direction. A shape of each of second lens units 301b as seen in the Y-axis direction is a substantially circular arc shape. A width of each of second lens units 301b in the X-axis direction is, for example, 70 μm.

In the light incident surface (the surface on the negative side of the Z-axis) of screen 301 having the above-described configuration, image display region D1 is scanned, as illustrated in FIG. 3B, in the positive direction of the Y-axis by beam B1 in which the laser beams of the respective colors are superimposed on one another. On image display region D1, scanning lines L1 to Ln through which beam B1 passes are set beforehand at constant intervals in the X-axis direction. Start positions of scanning lines L1 to Ln coincide with one another in the Y-axis direction, and end positions of scanning lines L1 to Ln coincide with one another in the Y-axis direction. A diameter of beam B1 is set to approximately 50 μm, for example.

Scanning lines L1 to Ln are scanned by high frequency beam B1 in which the laser beams of the respective colors are modulated by the image signal, thereby forming an image. The thus formed image is projected onto the region (eyebox) in the periphery of the position of eye 2a of driver 2 via screen 301, mirrors 22, 23, and windshield 12 (refer to FIG. 1C). In this way, driver 2 visually recognizes image 30 as a virtual image in a space in front of windshield 12.

Incidentally, in this exemplary embodiment, as described above, screen 301 is disposed so as to be inclined with respect to a plane perpendicular to a light incident direction of a main light ray of the laser beam, which is a plane perpendicular to the Z-axis (refer to FIG. 2). Therefore, in image 30 displayed as the virtual image, a portion generated on the negative side of the X-axis in screen 301 has a larger viewing distance from a viewpoint of driver 2 than that of a portion generated on the positive side of the X-axis in screen 301. In other words, by inclining screen 301 in this manner, an imaging position of the virtual image projected from screen 301 can be gradually more distant as the imaging position goes from an end on the positive side of the X-axis of screen 301 to an end on the negative side of the X-axis of screen 301. Accordingly, by disposing screen 301 so as to be inclined in this manner, image 30 whose viewing distance gradually varies in the depth direction can be displayed.

However, when screen 301 is disposed so as to be inclined in this manner, a distance between converging lens 107 and screen 301 increases as it goes forward in the positive direction of the X-axis. Therefore, when screen 301 is scanned as illustrated in FIG. 3B, a distance between each scanning line and converging lens 107 is different for each of scanning lines L1 to Ln. Hence, when a focal distance of converging lens 107 is set so as to focus on a predetermined scanning line, the laser beam dose not focus on the other scanning lines, thereby increasing a diameter of beam B1.

Figure 4A:
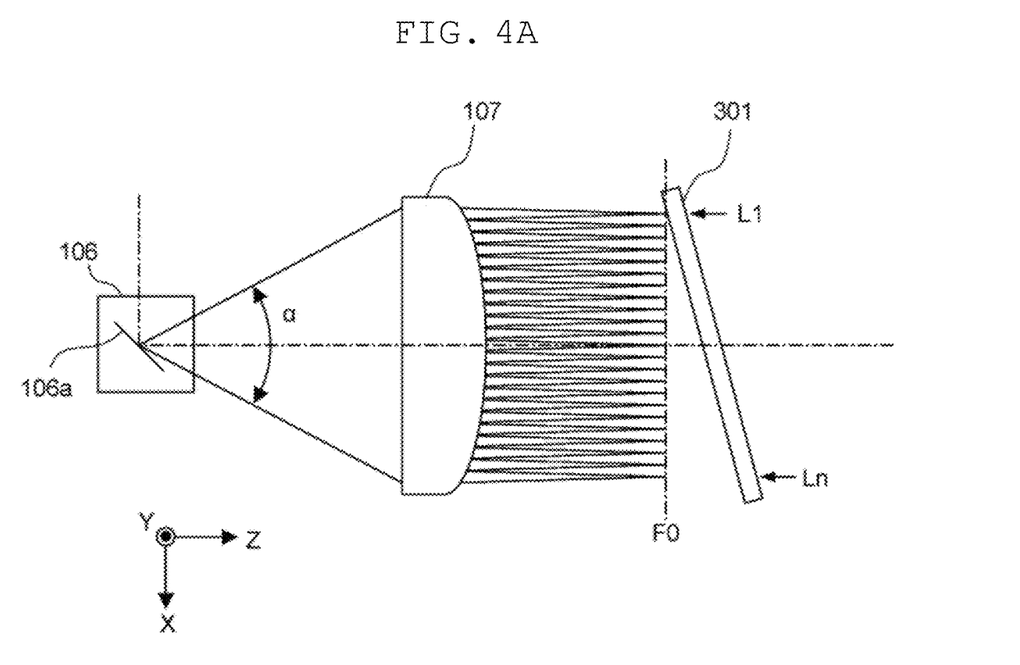
FIG. 4A is a schematic side view illustrating a converging state of a laser beam with respect to a screen according to a comparative example.

FIG. 4A is a schematic side view illustrating a converging state of laser beam with respect to screen 301 according to a comparative example. FIG. 4A schematically illustrates the converging state of the laser beam when each of scanning lines L1 to Ln is scanned. α denotes a swing angle of the laser beam in a direction parallel to the X-Z plane.

As illustrated in FIG. 4A, in the comparative example, optical distance correction member 108 illustrated in FIG. 2 is not disposed between converging lens 107 and screen 301. In this case, when converging lens 107 is set such that focusing position F0 of the laser beam is positioned on uppermost scanning line L1, a gap between focusing position F0 and screen 301 increases as it goes to a lower scanning line. Therefore, a beam diameter of the laser beam in the scanning line increases as it goes to the lower scanning line, thereby decreasing definition of image 30 drawn by screen 301.

Figure 4B:
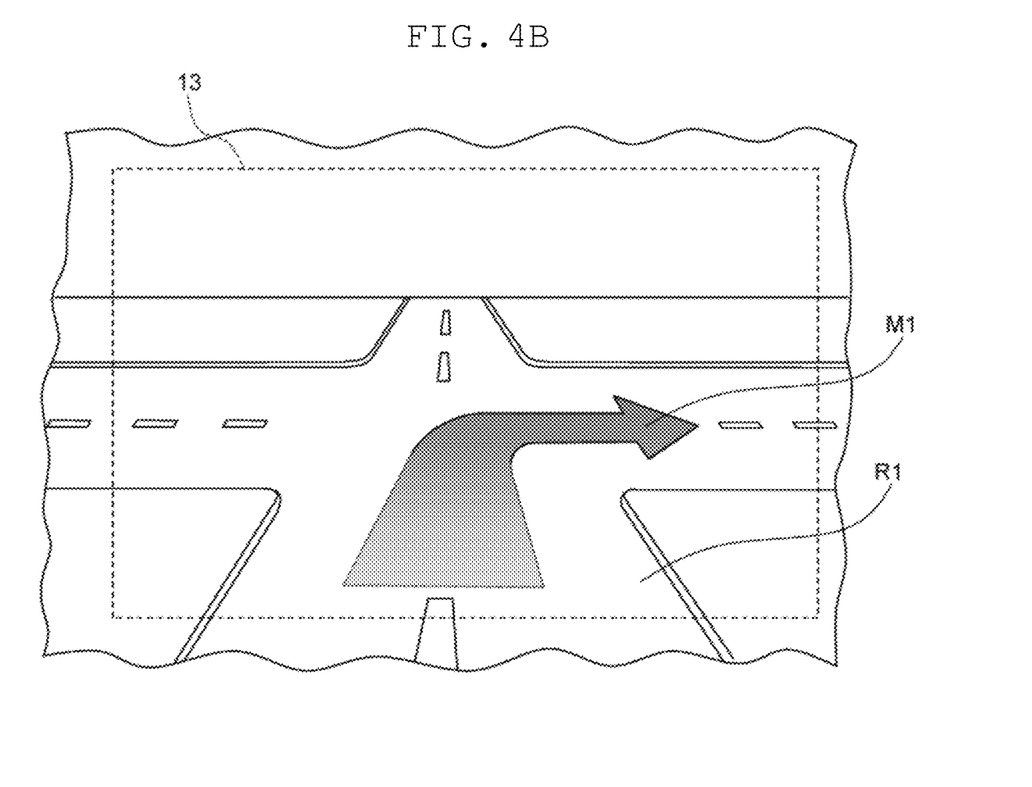
FIG. 4B is a schematic view illustrating a display example of an image according to the comparative example.

FIG. 4B is a schematic view illustrating a display example of an image according to the comparative example.

As described above, screen 301 disposed so as to be inclined enables display of depth image M1 whose viewing distance varies in the depth direction as the virtual image. In the example of FIG. 4B, depth image M1 is an arrow for suggesting a direction, in which vehicle 1 should turn on road R1, to driver 2 by a navigation function. Among scanning lines L1 to Ln illustrated in FIG. 3B, laser light sources 101a to 101c on scanning lines corresponding to depth image M1 are caused to emit light in a section corresponding to depth image M1 with predetermined intensity, whereby depth image M1 illustrated in FIG. 3B can be displayed as the virtual image.

However, in the comparative example, as described with reference to FIG. 4A, the gap between focusing position F0 and screen 301 increases as it goes toward the lower scanning line, and hence the beam diameter of the laser beam in the scanning line increases as it goes to the lower scanning line. Therefore, as illustrated in FIG. 4B, with respect to depth image M1 drawn by screen 301, the definition is lowered more with a position having a shorter viewing distance, which is thus closer to the driver, thereby deteriorating visibility.

In this exemplary embodiment, in order to solve such a problem, optical distance correction member 108 is disposed on a side closer to light source 101 with respect to screen 301.

Figure 5A:
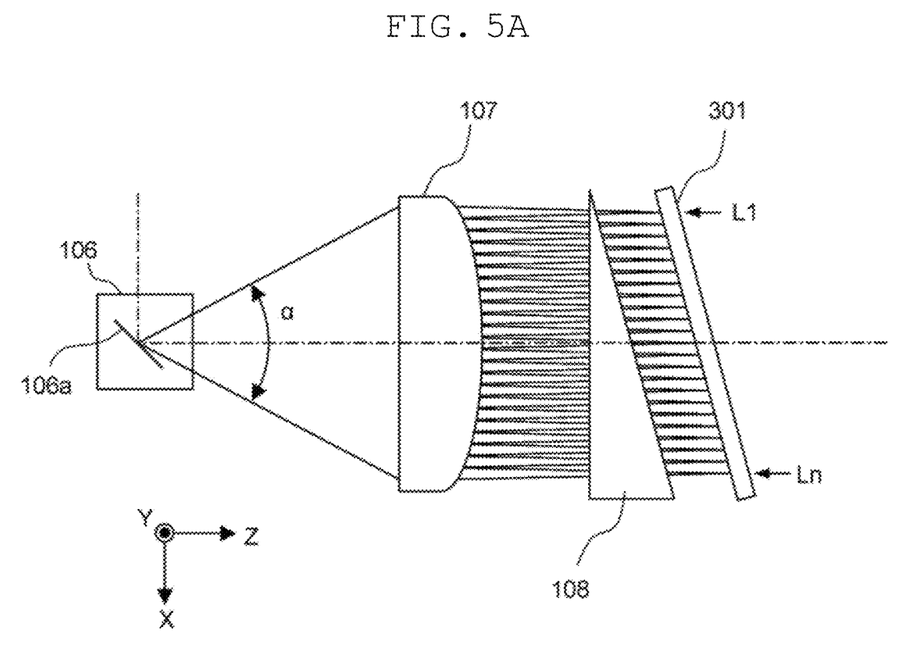
FIG. 5A is a schematic side view illustrating a converging state of the laser beam with respect to the screen according to the exemplary embodiment.

FIG. 5A is a schematic side view illustrating a converging state of the laser beam with respect to screen 301 according to the exemplary embodiment.

In this exemplary embodiment, optical distance correction member 108 is configured with a prism whose thickness increases as it goes toward the positive direction of the X-axis. Optical distance correction member 108 is formed of glass, for example. A shape of optical distance correction member 108 as seen in the Y-axis direction is a triangle, and a shape of optical distance correction member 108 as seen in the Z-axis direction is a rectangle having a size substantially identical to a size of image display region D1 illustrated in FIG. 3A.

A refractive index of optical distance correction member 108 is higher than that of air. Therefore, an optical distance of the laser beam during transmitting through optical distance correction member 108 is made longer as the thickness of optical distance correction member 108 is made larger. In other words, the optical distance of the laser beam during transmitting through optical distance correction member 108 is made longer as a transmitting position of the laser beam goes toward the positive direction of the X-axis. With this configuration, the focusing position of the laser beam converged by converging lens 107 is shifted more in the Z-axis direction as the transmitting position of the laser beam with respect to optical distance correction member 108 goes toward a positive side of the X-axis. With this effect, even when the laser beam scans any scanning line, the laser beam can be caused to focus on the light incident surface of screen 301, whereby the beam diameter of the laser beam can be converged small.

Note that, a correction amount of the optical distance for each scanning line is determined according to the refractive index and the thickness of optical distance correction member 108. Therefore, the refractive index and the thickness of optical distance correction member 108 are adjusted such that the laser beam can be focused on the light incident surface of screen 301 in all scanning lines.

Figure 5B:
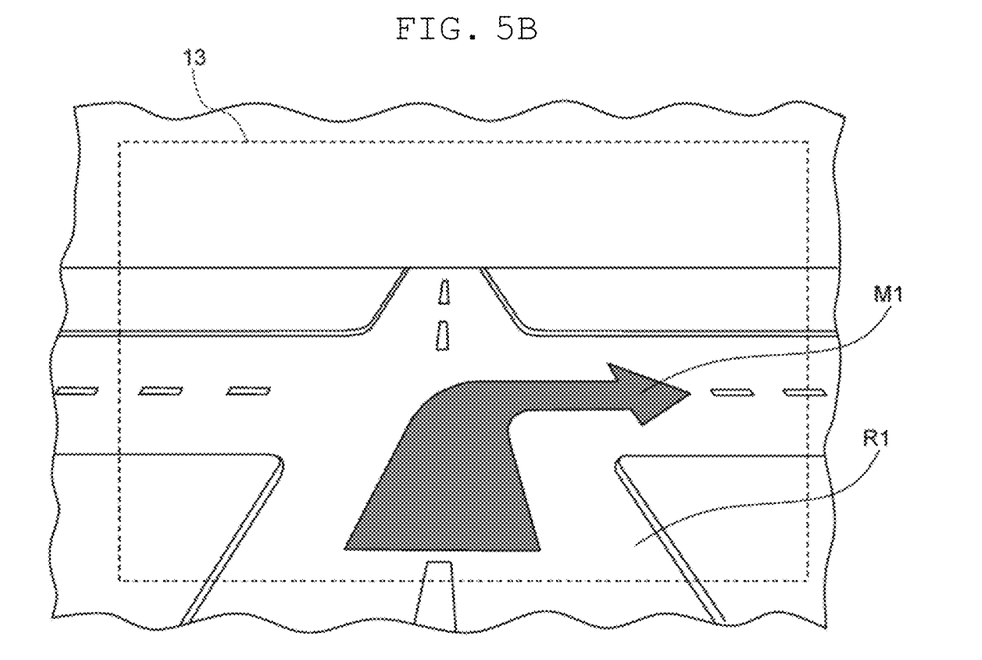
FIG. 5B is a schematic view illustrating a display example of an image according to the exemplary embodiment.

FIG. 5B is a schematic view illustrating a display example of an image according to the exemplary embodiment.

In the exemplary embodiment, similar to the comparative example, screen 301 is disposed so as to be inclined, whereby depth image M1 can be displayed. Furthermore, in the exemplary embodiment, optical distance correction member 108 is disposed, whereby the laser beam can be focused on the light incident surface of screen 301 in all scanning lines L1 to Ln. Thus, the beam diameter of the laser beam can be converged small even in any of scanning lines L1 to Ln, and entire depth image M1 can be displayed with high definition, as illustrated in FIG. 5B. As described above, the configuration in the exemplary embodiment can improve visibility of depth image M1.

Subsequently, an effect of refraction correction member 109 will be described with reference to FIG. 6A.

As described above, when optical distance correction member 108 is configured by the prism, a traveling direction of the laser beam that is incident to optical distance correction member 108 is bent due to refraction. A bold solid line in FIG. 6A indicates a trajectory of the laser beam (main light ray ML0) when mirror 106a of scanning unit 106 is positioned at a neutral position.

On the other hand, refraction correction member 109 is configured with a prism whose thickness increases as it goes toward the negative direction of the X-axis. Refraction correction member 109 is formed of glass, for example. A shape of refraction correction member 109 as seen in the Y-axis direction is a triangle, and a shape of refraction correction member 109 as seen in the Z-axis direction is a rectangle. A refractive index of refraction correction member 109 is higher than that of air.

Figure 6A:
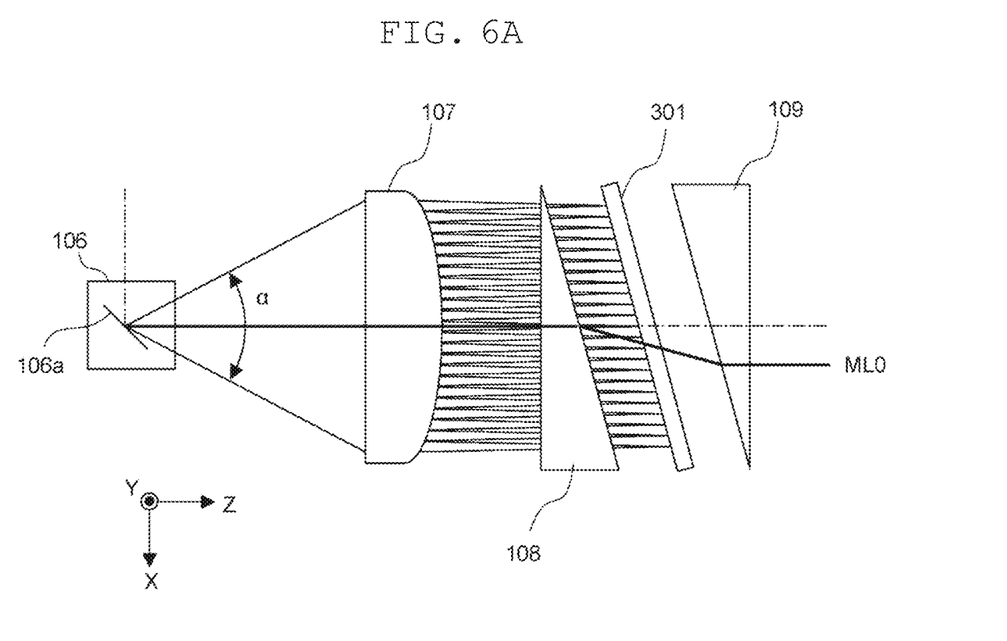
FIG. 6A is a schematic side view illustrating an effect of a prism at a rear stage side according to the exemplary embodiment.

As illustrated in FIG. 6A, by disposing refraction correction member 109 in this manner, the traveling direction of main light ray ML0, which has been bent by optical distance correction member 108, can be bent in a reversed direction due to refraction of refraction correction member 109 when main light ray ML0 transmits through refraction correction member 109. Thus the traveling direction of main light ray ML0 can be returned to an original traveling direction (Z-axis direction). This effect is applied to the laser beam in any of scanning lines L1 to Ln by refraction correction member 109. Refraction correction member 109 thus exerts the effect for correcting the traveling direction of the laser beam.

Refraction correction member 109 also exerts an effect for canceling color breakup produced by optical distance correction member 108. In other words, as described above, in this exemplary embodiment, the red, green, and blue laser beams respectively emitted from laser light sources 101a, 101b, and 101c enter optical distance correction member 108 in such a state that optical axes of the laser beams are aligned with one another. In this case, refractive indexes of optical distance correction member 108 for the respective colors are different from one another. Therefore, optical axis deviations (color breakup) due to different refractive angles are produced between the laser beams of the respective colors after transmitting through optical distance correction member 108.

In this exemplary embodiment, as illustrated in FIG. 6A, refraction correction member 109 is disposed upside down with respect to optical distance correction member 108. Therefore, the laser beams of the respective colors respectively receive refractive effects from refraction correction member 109 so as to suppress the optical axis deviations (color breakup). By this configuration, the optical axis deviations (color breakup) produced by optical distance correction member 108 can be cancelled.

Note that, in a configuration of FIG. 6A, when refraction correction member 109 applies the effect for correcting the traveling direction of the laser beam and the effect for canceling the color breakup to the laser beam, refraction correction member 109 is needed to apply, in a reversed manner, refraction similar to the refraction produced by optical distance correction member 108 to the laser beams of the respective colors. In this case, refraction correction member 109 can be configured to have the same shape and refractive index as those of optical distance correction member 108, for example.

Furthermore, refraction correction member 109 also exerts an effect for further amplifying a change in viewing distance of the virtual image. In other words, as illustrated in FIG. 6A, the thickness of refraction correction member 109 increases as it goes toward the negative direction of the X-axis. Accordingly, an optical distance of the laser beam during transmitting through refraction correction member 109 is made longer as a scan position of the laser beam goes toward the negative side of the X-axis. Hence, the viewing distance for the virtual image is made more distant as a position of the virtual image corresponding to a scanning line goes toward the negative side of the X-axis. Thus, at a position of the virtual image whose viewing distance is made distant by inclining screen 301, the viewing distance is further extended by an amplifying effect for the optical distance, which is caused by refraction correction member 109.

As described above, refraction correction member 109 exerts the effect for canceling the color breakup and the effect for amplifying a change in viewing distance of the virtual image, in addition to the effect for correcting the traveling direction of the laser beam illustrated in FIG. 6A. Accordingly, in this exemplary embodiment, the inclination angle of screen 301 and the refractive indexes and thicknesses of optical distance correction member 108 and refraction correction member 109 are adjusted such that the virtual image (image 30) having a desired change in viewing distance is displayed without the color breakup, taking those effects into account.

Effects of Exemplary Embodiment

According to the above-described exemplary embodiment, the following effects are exerted.

Screen 301 is disposed so as to be inclined such that the viewing distance of the virtual image gradually increases, whereby image 30 whose viewing distance gradually varies in the depth direction can be displayed as the virtual image. Furthermore, optical distance correction member 108 causes the distance between screen 301 and the focusing position of the laser beam transmitting through converging lens 107 to be substantially identical over entire image display region D1 in screen 301. Therefore, the laser beam can uniformly be focused on screen 301 in any scanning line. Hence, the beam diameter of the laser beam can be converged small in any scanning line, and image 30 (depth image M1) with high definition and extremely excellent visibility can be displayed.

Furthermore, in this exemplary embodiment, as illustrated in FIG. 6A, optical distance correction member 108 is configured by the prism in which the thickness of the portion facing the end of screen 301 (the end on the positive side of the X-axis of screen 301), which is distant from converging lens 107, is larger than the thickness of the portion facing the end of screen 301 (the end on the negative side of the X-axis of screen 301), which is close to converging lens 107. This configuration allows optical distance correction member 108 to be formed at low cost, and to be easily installed without complicated work.

In addition, in this exemplary embodiment, as illustrated in FIG. 6A, refraction correction member 109 for correcting the refraction produced in the laser beam by optical distance correction member 108 is further disposed at the side opposite to optical distance correction member 108 with respect to screen 301. With this configuration, as described with reference to FIG. 6A, the traveling direction of the laser beam, which has been bent by the refraction produced by optical distance correction member 108, is bent in the reversed direction due to the refraction produced by refraction correction member 109. Thus the traveling direction of the laser beam is returned to the original direction. Therefore, an optical system, which is at a subsequent stage, can smoothly generate image 30 as the virtual image.

In addition, in this exemplary embodiment, the color breakup produced by optical distance correction member 108 can be suppressed by refraction correction member 109, and further the change in viewing distance produced by image 30 can be amplified by refraction correction member 109.

Furthermore, in this exemplary embodiment, as illustrated in FIG. 6A, refraction correction member 109 is configured by the prism in which the thickness of the portion facing the end of screen 301 (the end on the positive side of the X-axis of screen 301), which is distant from converging lens 107, is smaller than the thickness of the portion facing the end of screen 301 (the end on the negative side of the X-axis side of screen 301), which is close to converging lens 107. By this configuration, refraction correction member 109 can be formed at low cost, and be easily installed without complicated work.

The exemplary embodiment of the present disclosure has been described above. However, the present disclosure is not limited to the exemplary embodiment described above, and various modifications can be applied to application examples according to the present disclosure besides the exemplary embodiment described above.

<First Modification>

Figure 6B:
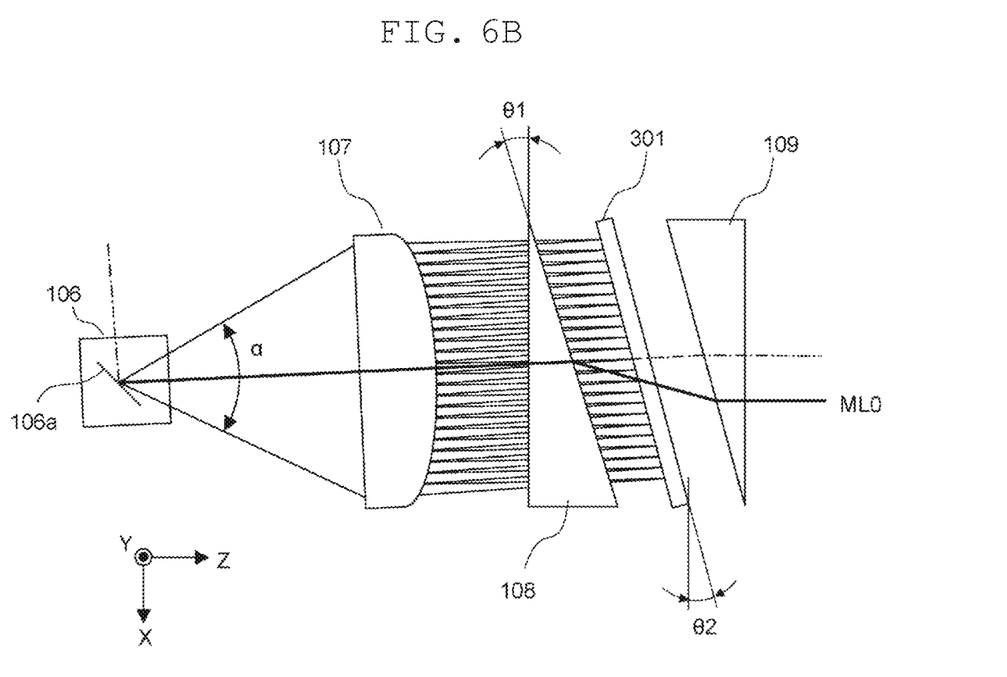
FIG. 6B is a schematic side view illustrating a configuration in the periphery of a screen according to a first modification.

FIG. 6B is a schematic side view illustrating a configuration in the periphery of screen 301 according to a first modification.

In the first modification, angle θ1 between a light incident surface and a light emitting surface of optical distance correction member 108 is made larger than inclination angle θ2 of screen 301 with respect to a plane perpendicular to the Z-axis. As illustrated in FIG. 6B, when angle θ1 is set in this manner, an optical block from light source 101 to converging lens 107 can be disposed so as to be inclined in the positive direction of the X-axis. Further, mirror 106a of scanning unit 106 can be configured not to be included in image display region D1 (refer to FIG. 3A) of screen 301 when screen 301 is seen in the negative direction of the Z-axis.

Note that, for convenience of explanation, respective members are illustrated large in size, and are illustrated close to each other, in FIG. 6B. Therefore, mirror 106a of scanning unit 106 can be included in image display region D1 of screen 301 when screen 301 is seen in the negative direction of the Z-axis. However, actually, screen 301 and mirror 106a are considerably small in size and are largely apart from each other. Therefore, as illustrated in FIG. 6B, when the optical block from light source 101 to converging lens 107 is inclined in the positive direction of the X-axis, mirror 106a of scanning unit 106 can be configured not to be included in image display region D1 of screen 301 when screen 301 is seen in the negative direction of the Z-axis.

According to the configuration of the first modification, when screen 301 is seen in the negative direction of the Z-axis, mirror 106a of scanning unit 106 is not included in image display region D1 of screen 301 as described above. Therefore, a light-emitting point with high intensity, which is a reflection point of mirror 106a, can be configured not to be included within the eyebox. This configuration prevents a contrast of image 30 from being lowered due to the light-emitting point with high intensity, and improves the contrast of image 30, as a result.

<Second Modification>

Figure 7:
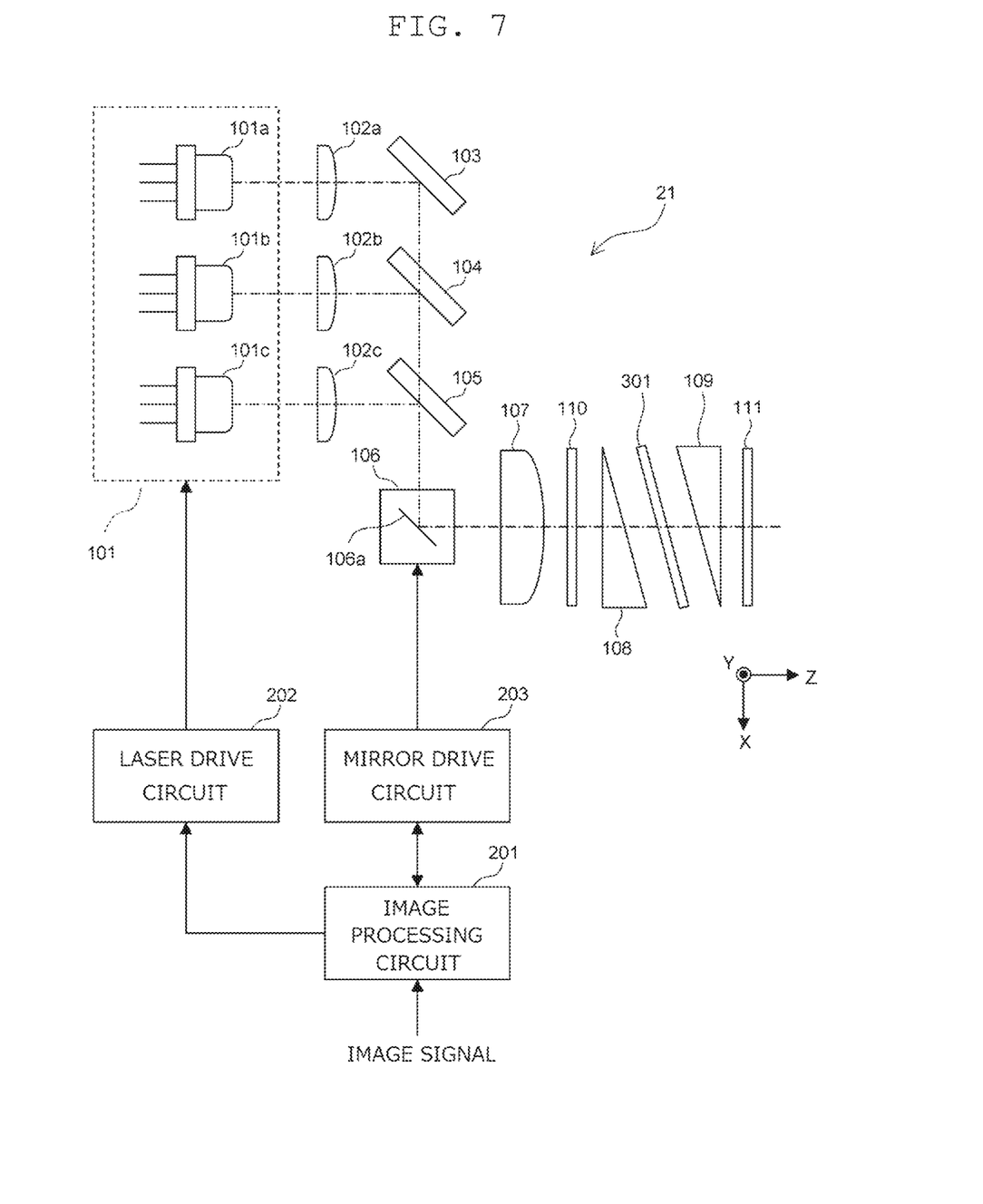
FIG. 7 is a diagram illustrating a configuration of an irradiation light generator of an image display device according to a second modification and a configuration of a circuit used for the irradiation light generator.

FIG. 7 is a diagram illustrating configurations of irradiation light generator 21 of image display device 20 according to a second modification and of a circuit for use in irradiation light generator 21.

In the second modification, optical distance correction member 108 is formed of a birefringence material such as crystal or lithium niobate. Similar to the above-described exemplary embodiment, refraction correction member 109 is formed of a non-birefringence material such as glass. Further, in the second modification, half-wave plates 110, 111 are respectively disposed in front of optical distance correction member 108 and behind of refraction correction member 109. Other configurations are the same as those of the above-described exemplary embodiment.

According to the configuration of the second modification, an optical distance of laser beam incident on optical distance correction member 108 is corrected with a correction amount according to a position in an X-axis direction, similar to the above-described exemplary embodiment. Accordingly, similar to the above-described exemplary embodiment, in any scanning line, it is possible to cause the laser beam to enter screen 301 with a substantially minimum diameter.

In addition, in the configuration of the second modification, optical distance correction member 108 is formed of the birefringence material. Therefore, the laser beam incident on optical distance correction member 108 is separated into a normal light beam and an abnormal light beam according to an inclination of a polarization direction with respect to an optical axis of the birefringence material. The normal light beam and the abnormal light beam, which are separated from each other, respectively focus on different positions from each other in a traveling direction of the laser beam. Hence, in the configuration of the second modification, a range in which the beam diameter is minimized can be generated between a focusing position of the normal light beam and a focusing position of the abnormal light beam. Therefore, the range in which the beam diameter is minimized can be broadened in comparison with the above-described exemplary embodiment. Hence, in comparison with the above-described exemplary embodiment, according to the configuration of the second modification, the laser beam can enter screen 301 with the minimum beam diameter more easily and smoothly, whereby a position of optical distance correction member 108 with respect to screen 301 can be adjusted more easily.

Note that, half-wave plate 110 is provided to adjust the polarization direction of the laser beam with respect to an optical axis of optical distance correction member 108. As described in the above-described exemplary embodiment, the polarization directions of the laser beams of the respective colors are made equal to one direction. A rotational position of half-wave plate 110 with respect to an optical axis thereof is adjusted such that the laser beams of the respective colors are inclined with respect to the optical axis of optical distance correction member 108 by a predetermined angle.

Half-wave plate 111 is provided to further adjust the polarization directions of the laser beams of the respective colors, which have been adjusted by half-wave plate 110. More specifically, a rotational position of half-wave plate 111 with respect to an optical axis thereof is adjusted such that the polarization directions of the laser beams of the respective colors are made equal to a horizontal direction, when the laser beams enter windshield 12.

By disposing half-wave plates 110, 111 in this manner, inclination angles of the polarization directions of the laser beams of the respective colors with respect to optical distance correction member 108 can easily be adjusted. Further, the polarization directions of the laser beams of the respective colors when the laser beams enter windshield 12 can easily be adjusted.

Inclination angles of the polarization directions of the laser beams of the respective colors with respect to the optical axis of optical distance correction member 108 may be adjusted by respectively adjusting the rotational positions of laser light sources 101a to 101c with respect to respective emitting optical axes thereof. In this case, half-wave plate 110 can be omitted.

A direction of the optical axis of optical distance correction member 108 may be adjusted in advance such that all polarization directions of the laser beams of the respective colors after transmitting through optical distance correction member 108 are made equal to the horizontal direction when the laser beams enter windshield 12. In this case, half-wave plate 111 can be omitted.

<Third Modification>

Figure 8A:
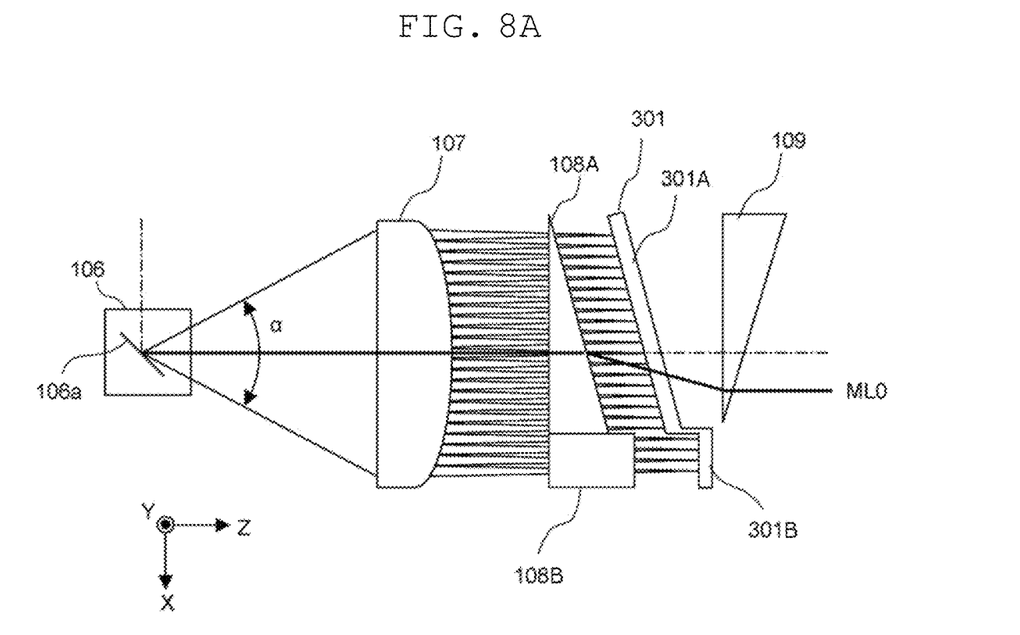
FIG. 8A is a schematic side view illustrating a configuration in the periphery of a screen according to a third modification.
Figure 8B:
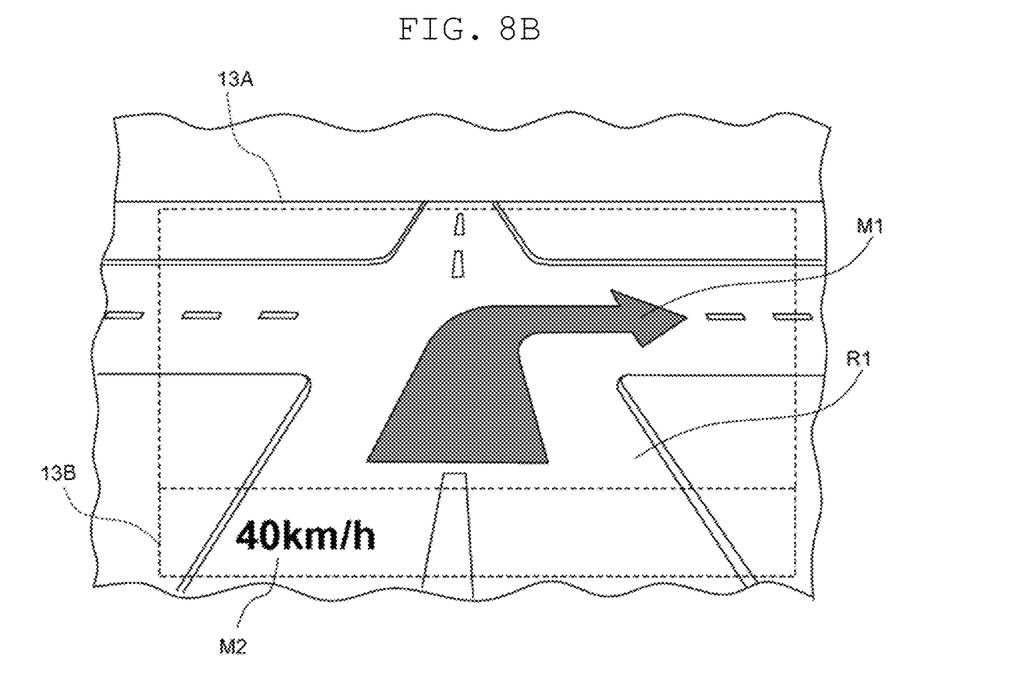
FIG. 8B is a view illustrating a display example of an image displayed by a configuration according to the third modification.

FIG. 8A is a schematic side view illustrating a configuration in the periphery of screen 301 according to a third modification. FIG. 8B is a view illustrating a display example of an image.

FIG. 8B illustrates an example in which information such as a speed of a vehicle is displayed at a position about 2 m ahead of driver 2 (viewing distance of 2 m), and information such as an arrow for navigation is displayed as an image provided with depth (viewing distance of 5 m to 100 m).

In order to vary the viewing distance according to a screen region, screen 301 is configured with two regions that are region 301A and region 301A. Region 301A is disposed so as to be inclined such that the viewing distance gradually varies from 5 m to 100 m, and region 301B is disposed so as not to be inclined at an optical position corresponding to the viewing distance of 2 m. A region of screen 301 is divided in this manner to shift positions of the divided regions to each other, whereby two viewing distance regions can be implemented.

At this time, region 301B is configured to protrude toward a virtual-image optical system (toward the positive side of the Z-axis). Therefore, it is preferable that optical distance correction member 108 is also divided into two regions that are region 108A and region 108B, a thickness of region 108B is made large, and an inclination of a light emitting surface of region 108B is made substantially equal to an inclination of region 301B. Furthermore, the refraction correction member of a portion corresponding to region 301B can be omitted.

As illustrated in FIG. 8B, such a configuration of screen 301 and optical distance correction member 108 is capable of displaying, on projection region 13A, depth image M1 that is drawn in region 301A, and displaying, on projection region 13B, fixed image M2 that is drawn in region 301B and has a constant viewing distance. Herein, an image showing a vehicle speed is displayed as fixed image M2.

Note that, in the third modification of FIG. 8A, screen 301 is divided into two regions 301A, 301B, but two screens may separately be disposed in place of two regions 301A, 301B.

<Other Modifications>

Optical distance correction member 108 may not necessarily be the prism, and may be any member as long as an optical distance of the member varies as a transmission position of laser beam varies in the X-axis direction. For example, optical distance correction member 108 may be configured with a member that has a rectangular parallelepiped shape and whose refractive index varies in the X-axis direction. In this case, the traveling direction of the laser beam is not bent by optical distance correction member 108, whereby refraction correction member 109 can be omitted.

Moreover, the above-described exemplary embodiment illustrates an example where the present disclosure is applied to the head-up display mounted on vehicle 1; however, the present disclosure can be applied not only to on-vehicle use but also to other types of image display devices.

Moreover, the configurations of image display device 20 and irradiation light generator 21 are not limited to the configurations illustrated in FIG. 1C and FIG. 2, and are modifiable as appropriate.

For example, in the above-described exemplary embodiment, as illustrated in FIG. 1C, the laser beam from irradiation light generator 21 is guided by two mirrors 22, 23 to windshield 12, but a single mirror for guiding the laser beam from irradiation light generator 21 to windshield 12 may be disposed, or three or more mirrors may be disposed. In the above-described exemplary embodiment, first lens units 301a and second lens units 301b are respectively disposed on the light incident surface and the light emitting surface of screen 301, but a plurality of lens units that diverges the laser beam in the X-axis direction and the Y-axis direction may be arranged in a two-dimensional manner, on either one of the light incident surface and the light emitting surface of screen 301.

In addition, the exemplary embodiment of the present disclosure can be modified in various ways as appropriate within the scope of the technical idea disclosed in the claims.

What is claimed is:

1. An image display device comprising:
   a light source;
   a screen which is irradiated with light from the light source and on which an image is formed;
   an optical device that forms a virtual image by using the light from the screen;
   a converging lens configured to converge the light emitted from the light source onto the screen;
   an optical distance correction device disposed between the converging lens and the screen; and
   a scanning device that scans the screen with the light from the light source,
   wherein the screen is disposed so as to be inclined with respect to a plane perpendicular to an optical axis of the converging lens so that a viewing distance of the virtual image gradually varies, the screen having a first end and a second end, the second end being closer to the converging lens than the first end is,
   wherein the optical distance correction device includes a first prism, and
   wherein a thickness of a portion of the first prism facing the first end is greater than a thickness of a portion of the first prism facing the second end so that a distance between the screen and a focusing position of the light is made substantially identical over an entire image display region in the screen.

2. The image display device according to claim 1, further comprising a refraction correction device configured to correct refraction occurred in the light due to the optical distance correction device, the refraction correction device being disposed at a side opposite to the optical distance correction device with respect to the screen.

3. The image display device according to claim 2,
   wherein the refraction correction device includes a second prism, and
   wherein a thickness of a portion of the second prism facing the first end is smaller than a thickness of a portion of the second prism facing the second end.

4. The image display device according to claim 1, wherein an angle between a light incident surface of the first prism and a light emitting surface of the first prism is greater than an angle between a light incident surface of the screen on which the light is incident and the plane perpendicular to the optical axis of the converging lens.

5. The image display device according to claim 1, wherein the optical distance correction device is constituted by a birefringence material.

6. The image display device according to claim 5, wherein, in a direction in which light is incident to the optical distance correction device, half-wave plates are respectively disposed in front of and behind of the optical distance correction device.

7. An image display device comprising:
   a light source;
   a screen which is irradiated with light from the light source and on which an image is formed;
   an optical device that forms a virtual image by using the light from the screen;
   a converging lens configured to converge the light emitted from the light source onto the screen;
   an optical distance correction device disposed between the converging lens and the screen; and
   a scanning device that scans the screen with the light from the light source,
   wherein the screen is disposed so as to be inclined with respect to a plane perpendicular to an optical axis of the converging lens so that a viewing distance of the virtual image gradually varies, the screen having a first end and a second end that is nearer to the converging lens than the first end is,
   wherein the optical distance correction device has a rectangular parallelepiped shape, and
   wherein a refractive index of the optical distance correction device varies in a direction extending from the second end to the first end so that a distance between the screen and a focusing position of the light is made substantially identical over an entire image display region in the screen.

* * * * *